March 23, 1954 R. A. SHIELDS 2,672,888
VARIABLE STROKE PISTON VALVE WITH CUSHIONING MEANS
Filed May 6, 1948
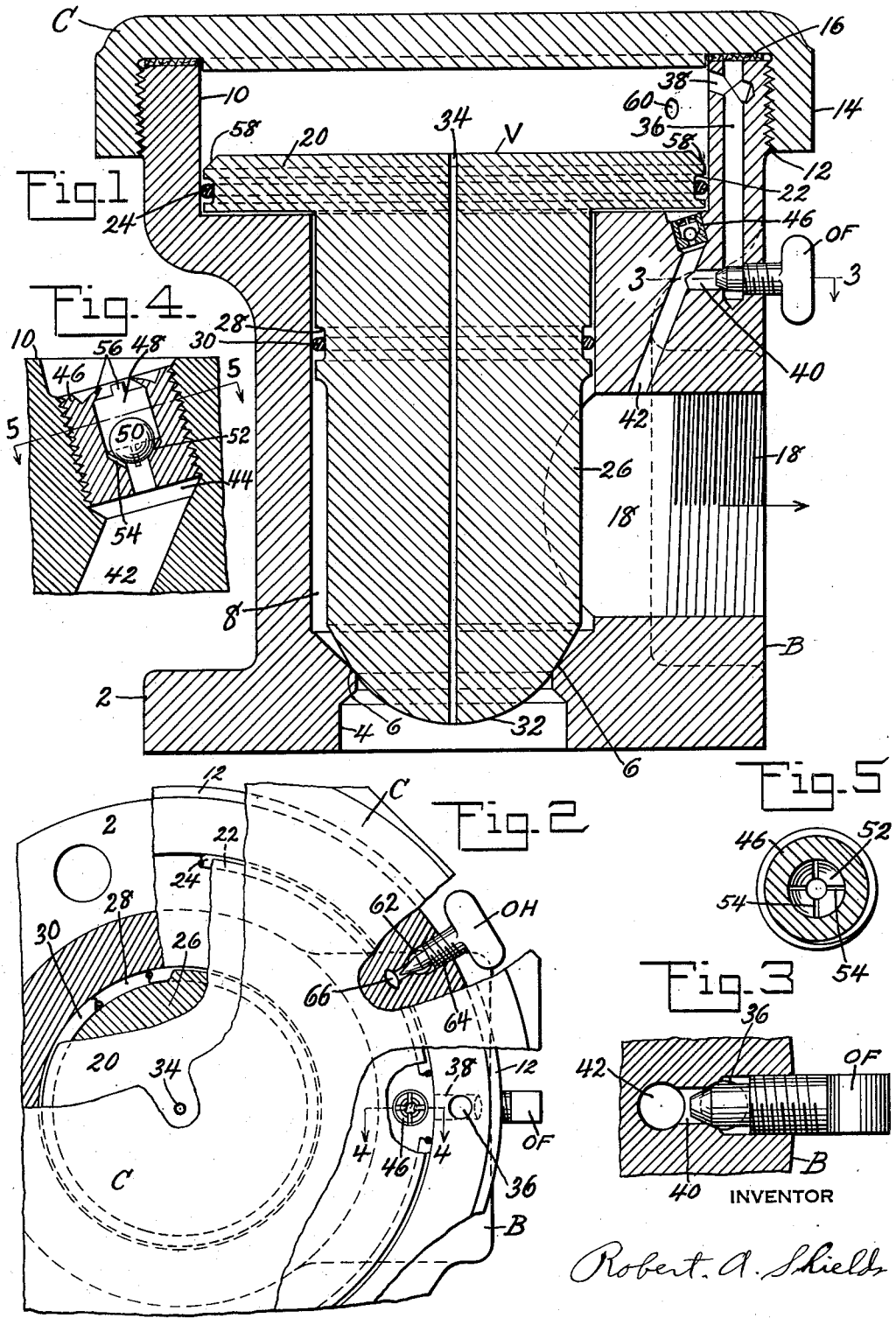
INVENTOR
Robert A. Shields Patented Mar. 23, 1954

2,672,888

UNITED STATES PATENT OFFICE 2,672,888

VARIABLE STROKE PISTON VALVE WITH CUSHIONING MEANS

Robert A. Shields, Bloomsburg, Pa., assignor to American Car and Foundry Company, New York, N. Y., a corporation of New Jersey Application May 6, 1948, Serial No. 25,322

5 Claims. (Cl. 137—663)

1

This invention relates to control valves in general and in particular to control valves which are operated by the line pressure.

The bulk of the valves used in industrial installations are for control purposes and are used either in a full open or closed position. In cases where throttling is desired, specially designed valves are used in which flow beans of graduated sizes can be inserted. With the normal type of control valve considerable trouble is experienced in preventing leaks around the operating stem or other control mechanism. Further, in large size valves it is impossible to manually operate the valves and power mechanism becomes necessary. It is an object, therefore, of the present invention to provide a control valve which is operated by the line pressure itself and which valve can be operated easily irrespective of size or line pressures.

A further object of the invention is the provision of a valve for controlling the flow of matter through a pipe line and which valve operator has no operating connections extending to the exterior.

A still further object of the invention is the provision of a pressure operated valve which can be held in a plurality of predetermined positions.

A yet further object of the invention is the provision of a control valve in which the seating pressure is proportional to the differential between the inlet and outlet pressures.

These and other objects of the invention will be apparent to persons skilled in the art from a study of the following description and accompanying drawings, in which Fig. 1 is a sectional view taken substantially through the center of the valve;

Fig. 2 is a plan view of the valve with parts broken away to better disclose the construction;

Fig. 3 is a sectional view taken substantially on line 3—3 of Fig. 1;

Fig. 4 is a sectional view taken substantially on line 4—4 of Fig. 2, and

Fig. 5 is a sectional view taken substantially on line 5—5 of Fig. 4.

Referring now to the drawings in detail it will be seen that the valve is made up of four main parts, namely, the body B, valve V, cap C and operator OF. The valve body as shown is of the angle type having a base flange 2 by means of which the valve may be bolted or otherwise fastened onto a source of pressure, such as a tank or pipe line. The base flange is centrally bored as at 4 to provide an entrance passageway in which is located the inwardly projecting seat portion 6. Above the seat portion the valve body is bored out as at 8 and this bored out portion merges into

2 an upper cylinder 10 of considerably larger diameter than the bore 8 or the portion of the passage enclosed by the seat 6. The upper end of the valve body as shown is enlarged to provide space for the cylinder portion 10 and the exterior of this enlarged portion is externally threaded as at 12. The cap C has a downturned rim 14 internally threaded to engage with the threads 12, whereby the cap may be tightly screwed into place closing the upper end of the cylinder 10. Leakage past threads 12 is prevented by a gasket or other means 16. As clearly shown, an outlet passage 18 is provided substantially at right angles to the passage 4 and bore 8 and in the type of valve shown this outlet passage is threaded to receive a pipe or other means for discharging material passing through the valve.

The valve V as shown is provided with a piston head end 20 in the periphery of which is cut a groove 22 for reception of an O-ring seal member 24. Projecting downwardly from the piston head end is the stem portion 26, an intermediate portion of which is grooved as at 28 to receive an O-ring 30. The O-rings 24 and 30 are formed of resilient material and are adapted to be lightly compressed against the bore of cylinder 10 and valve body 8 and under pressure will be urged into the small clearances between the valve and body bores, thus effectively sealing against any leakage past the rings. Below the O-ring 30, the valve is reduced in diameter and extends downwardly to terminate in a spherical end 32 adapted to cooperate with the body seat 6. In order that pressure from the inlet passage 4 may hold the valve seated, a small passage 34 is drilled longitudinally through the valve thereby connecting the space in the inlet passage with the space above the piston end 20.

The metal of the valve body adjacent the outlet passage 18 is necessarily thickened to strengthen and brace the outlet passage and in this thickened portion various control passages are drilled or otherwise formed. As clearly shown, a vertical passage 36 is bored downwardly in the rim portion of the valve body and the upper end of this passage is intercepted by a transverse passage 38 connecting the vertical passage 36 with the interior of the valve cylinder. Adjacent the lower end of passage 36, a transverse passage 40 is drilled from the exterior of the valve body and the outer portion of this passage is enlarged and threaded to receive the threads of the operator or control member OF. This control member has its inner end reduced in diameter and tapered so as to seat against the metal of the body and effectively prevent communication between passage 36 and 40 when the operator is in the closed position. The stem of operator OF will preferably be sealed with respect to the valve body by means of a tiny O-ring (not shown) thereby preventing leakage past the threads of the operator. A passage 42 is drilled upwardly from the outlet passage until it intersects the transverse passage 40 thereby connecting the passage 40 with the outlet passage 18. As most clearly shown in Fig. 4, a passage 44 is drilled downwardly from the bottom of the cylinder 10 to intersect passage 42 and this passage is enlarged and threaded to receive a ball check assembly 46. This ball check assembly is formed with an interior bore 48 in which is located a ball 50. The ball 50 is adapted to be forced onto its seat 52 by pressure acting downwardly in passage 44 but the ball can not completely close the passage since small notches or grooves 54 (Figs. 4 and 5) are cut in the seat 52. Upward movement or loss of the ball from the assembly is prevented by inturned fingers 56. It is to be noted that passage 38 enters the cylinder adjacent its upper end and in order that the piston 20 does not block off the passage 38, its edge is beveled as at 58.

In certain instances it may be desirable to permit half or some fractional opening of the valve and to this end a passage 60 is bored from an intermediate portion of the cylinder wall 10 into a vertical passage 62, which passage is intersected by a transverse passage 64 which is threaded and adapted to receive an operator OH. The inner end of this operator is tapered to seat in the passage 64 and control flow of matter from passage 62 into a passage 66. The passage 66 may communicate directly with passage 42 or with the outlet passage 18 and this passage 66 will be equipped at its upper end with a ball check assembly similar to that described in connection with Figs. 4 and 5. The passages 60, 62, 64 and 66 will correspond respectively to the passages 38, 36, 40 and 42 previously described in connection with Fig. 1, the only difference being that the passage 60 enters the cylinder at a predetermined distance intermediate the ends thereof.

A large seating pressure is due to the fact that the piston area 20 is so much larger than the area of the exposed end 32 and pressure can pass from passage 4 through small passage 34 into the cylinder above the piston. Leakage of any material out of the cylinder is prevented by the O-ring 24 and by the cap C. In cases where it is desired to open the valve fully the full operator OF will be turned thereby letting matter flow out of the cylinder through passages 38, 36, 40 and 42 into the discharge or outlet passage 18. Since the passages 38 to 42 are of much greater area than passage 34, the pressure in the cylinder will be greatly reduced and the line pressure in passage 4 will force the valve off its seat thereby letting matter flow from passage 4 into outlet passage 18. During the upward movement of the valve the space enclosed between O-rings 24 and 30 will increase but this may be possible by the flow of matter from passage 42 past ball check 50 into the space. The flow of matter through the valve will maintain the same in fully open position and when it is desired to close the valve the full operator OF will be closed, thus preventing flow of matter out of the cylinder. As soon as the flow has been stopped the pressure in the cylinder builds up and the valve is forced into its closed position. Due to the large difference in area and large seating pressures, the valve might be damaged during closing and for that reason the ball check 50 with the slow bleeding passages 54 is provided. This acts as a dash pot and prevents the rapid or harmful seating of the valve. In cases where it is desired to open the valve half or some other predetermined value, the operator OH will be turned thereby permitting flow of matter from passage 60 into 62, 64 and 66. The valve will again rise to permit flow of matter from passage 4 into 18 but as soon as the valve or piston end 20 tends to cut off the passage 60, its rising action will be stopped and the valve will float in a partially open position. The floating position of the partially open valve will depend upon the various pressure valves and the exact location of passage 60. It will, of course, be obvious that where added predetermined openings of the valve are desired, these can be obtained by added passages, such as 60.

It is to be noted that the seating pressure of the valve on the body seat 6 will be directly proportional to the line pressure in passage 4, that is, the higher the line pressure the higher the seating pressure, but regardless of line pressures or valve sizes the valve can be easily and quickly operated by the mere turning of a small operator, such as OF or OH. With the construction as shown the only possible source of leakage out of the valve is past the operator stems OF or OH and as previously stated this can be effectively sealed by means of tiny O-rings (not shown) and which O-rings are very effective up to three thousand pounds pressure. While the valve has been described more or less in detail with particular reference to the drawings, it will be obvious that various modifications and rearrangements other than those shown and described may be made and all such modifications are contemplated as will fall within the scope of the appended claims defining my invention.

What is claimed is:

1. In a reciprocating plug valve the combination of a valve body, inlet and outlet passages formed in said body, a bore connecting said passages and having a valve seat therein adjacent the lower end thereof, an enlargement of said bore providing a cylinder adjacent the upper end of the bore, a valve plug reciprocable within said bore from a closed position on said valve seat to an open position permitting flow of matter between said inlet and outlet passages, an enlargement on said valve plug forming a piston end reciprocable in said cylinder, spaced sealing means sealing said plug and piston end with respect to said bore and cylinder, a first duct extending through said plug and piston end and connecting said inlet passage and cylinder space above said piston end, a second duct extending through parts of said body and connecting the cylinder space above said piston end with said outlet passage for the flow of matter therebetween, a third duct connecting said outlet passage and said bore between said spaced sealing means, an operator valve controlling the flow of matter through said second duct whereby said valve plug may be moved between open and closed positions by the pressure of matter in said inlet passage, and means in said third duct controlling the flow of matter therethrough to permit a greater rate of flow in one direction than in the other direction.

2. In a reciprocating plug valve the combination of a valve body, inlet and outlet passages formed in said body, a bore connecting said passages and having a valve seat therein between said passages and an enlarged portion beyond said passages, a valve plug reciprocable within said bore and being formed with an enlarged head end positioned in the enlarger portion of the bore and a stem portion having a face adapted to engage said valve seat to substantially close said inlet passage when the valve is closed, spaced apart sealing means sealing said head and stem portions of the plug with respect to said bore and mutually enclosing a space, a cap closing said bore and located in spaced relation to the head end of said plug, a first duct extending through said plug and connecting said inlet passage with the space between said cap and head end of the plug, a second duct extending from said space to an area of lower pressure than exists in said inlet passage, a third duct connecting the space between said spaced sealing means and an area of lower pressure than exists in said inlet passage and including portions of said second duct, an operator valve controlling the flow of matter through said second duct whereby said plug may be moved between open and closed positions by the pressure of matter in said inlet passage, and a ball check in said third duct controlling the flow of matter into and out of the space between said sealing means during reciprocation of said valve plug.

3. In a reciprocating plug valve the combination of a valve body, inlet and outlet passages formed in said body, a bore connecting said passages and having a valve seat therein between said passages and an enlarged portion beyond said passages, a valve plug reciprocable within said bore and being formed with an enlarged head end positioned in the enlarged portion of the bore and a stem portion having a face adapted to engage said valve seat to substantially close said inlet passage when the valve is closed, spaced apart sealing means sealing said head and stem portions of the plug with respect to said bore and mutually enclosing a space, a cap closing said bore and located in spaced relation to the head end of said plug, a first duct extending through said plug and connecting said inlet passage with the space between said cap and head end of the plug, a second duct extending from said space to an area of lower pressure than exists in said inlet passage, an operator valve controlling the flow of matter through said second duct whereby said plug may be moved between open and closed positions by the pressure of matter in said inlet passage, a third duct connecting the space between said spaced sealing means and an area of lower pressure than exists in said inlet passage, and a flow control device in said third duct limiting the rate of flow from the space between said spaced sealing means to the area of lower pressure.

4. In a reciprocating plug valve the combination of a valve body, inlet and outlet passages formed in said body, a bore connecting said passages and having a valve seat therein between said passages and an enlarged portion beyond said passages, a valve plug reciprocable within said bore and being formed with an enlarged head end positioned in the enlarged portion of the bore and a stem portion having a face adapted to engage said valve seat to substantially close said inlet passage when the valve is closed, spaced apart sealing means sealing said head and stem portions of the plug with respect to said bore and mutually enclosing a space, a cap closing said bore and located in spaced relation to the head end of said plug, a first duct extending through said plug and connecting said inlet pressure with the space between said cap and head end of the plug, a second duct extending from said space to an area of lower pressure than exists in said inlet passage, an operator valve controlling the flow of matter through said second duct whereby said plug may be moved between open and closed positions by the pressure of matter in said inlet passage, a third duct connecting the space between said spaced sealing means and an area of lower pressure than exists in said inlet passage, and a flow control device in said third duct, said flow control device being so constructed and arranged as to permit rapid flow of matter toward said space and a slow flow out of said space.

5. In a reciprocating plug valve the combination of a valve body, inlet and outlet passages formed in said body, a bore connecting said passages and having a valve seat therein between said passages and an enlarged portion beyond said passages, a valve plug reciprocable within said bore and being formed with an enlarged head end positioned in the enlarged portion of the bore and a stem portion having a face adapted to engage said valve seat to substantially close said inlet passage when the valve is closed, spaced apart sealing means sealing said head and stem portions of the plug with respect to said bore and mutually enclosing a space, a cap closing said bore and located in spaced relation to the head end of said plug, a first duct extending through said plug and connecting said inlet passage with the space between said cap and head end of the plug, a second duct extending from said space to an area of lower pressure than exists in said inlet passage, an operator valve controlling the flow of matter through said second duct whereby said plug may be moved between open and closed positions by the pressure of matter in said inlet passage, a third duct connecting the space between said spaced sealing means and an area of lower pressure than exists in said inlet passage, and a flow control device in said third duct limiting the rate of flow through the duct in one direction only, said second and third ducts coinciding for a portion of their length and being connected to said outlet passage as an area of lower pressure than said inlet passage.

ROBERT A. SHIELDS.

References Cited in the file of this patent

UNITED STATES PATENTS

| Number | Name | Date |
|---|---|---|
| 318,899 | Haydn | May 26, 1885 |
| 817,040 | Buck | Apr. 3, 1906 |
| 885,459 | Engler | Apr. 21, 1908 |
| 963,385 | Oleson | July 5, 1910 |
| 1,129,533 | Williams | Feb. 23, 1915 |
| 1,148,160 | Eynon | July 27, 1915 |
| 1,479,947 | Way | Jan. 8, 1924 |
| 1,841,629 | Pigeolet | Jan. 19, 1932 |
| 2,183,601 | White | Dec. 19, 1939 |
| 2,329,001 | Robinson | Sept. 7, 1943 |
| 2,391,578 | Lawrence | Dec. 25, 1945 |

FOREIGN PATENTS

| Number | Country | Date |
|---|---|---|
| 8,382 | Great Britain | Apr. 9, 1913 |
| 105,609 | Great Britain | Apr. 19, 1917 |
| 714,681 | France | Sept. 8, 1931 |
| 720,860 | France | Dec. 12, 1931 |